(12) United States Patent
Kirk

(10) Patent No.: US 6,459,422 B1
(45) Date of Patent: Oct. 1, 2002

(54) GRAPHICAL USER INTERFACE FOR INPUTTING DATA

(75) Inventor: Richard Kirk, Guildford (GB)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/450,564

(22) Filed: Nov. 30, 1999

(30) Foreign Application Priority Data

Dec. 22, 1998 (GB) ............................................. 9828382

(51) Int. Cl.[7] ................................................. G06F 3/00
(52) U.S. Cl. ....................... 345/169; 345/168; 345/840; 345/172
(58) Field of Search ................................. 345/864, 168, 345/169, 156, 161, 854, 840, 172, 173, 702

(56) References Cited

U.S. PATENT DOCUMENTS 5,769,719 A  *  6/1998  Hsu ............................ 463/37
6,052,070 A  *  4/2000  Kivela et al. .................. 341/22
6,097,964 A  *  8/2000  Nuovo et al. ................ 455/550
6,141,011 A  * 10/2000  Bodnar et al. ............... 345/812
6,208,340 B1 *  3/2001  Amin et al. ................... 34/808

* cited by examiner

*Primary Examiner*—John Cabeca
*Assistant Examiner*—Kieu D Vu
(74) *Attorney, Agent, or Firm*—Fitzpatrick, Cella, Harper & Scinto

(57) ABSTRACT

The present invention concerns an interface for inputting data, the interface comprising two manually operable direction buttons, and microprocessor means for outputting signals generating a visual display comprising a menu, and in response to operation of the buttons enabling a user to make selections from the menu and to cause relative movement between the menu and a cursor, and wherein the microprocessor is adapted to respond to intermittent pressure of a single button to step the cursor relative to the menu in either a first or a second direction in dependence upon the button depressed.

26 Claims, 6 Drawing Sheets

FIG. 2

TABLE 1

| NAME | STATE | LEFT KEY ACTION | RIGHT KEY ACTION | TIMEOUT ACTION |
|---|---|---|---|---|
| XX | NO KEY PRESSED | KEY DOWN: GOTO XL. | KEY DOWN: GOTO XR. | NONE |
| XL | LEFT KEY PRESSED | KEY UP: STEP LEFT, GOTO XX. | KEY DOWN: GOTO XB. | t > 0.6s: STEP LEFT, GOTO LL. |
| LL | LEFT KEY HELD | KEY UP: GOTO XX | KEY DOWN: GOTO LR. | t > 0.2s: STEP LEFT. |
| XR | RIGHT KEY PRESSED | KEY DOWN: GOTO XB. | KEY UP: STEP RIGHT GOTO XX. | t > 0.6s: STEP RIGHT, GOTO RR. |
| RR | RIGHT KEY HELD | KEY DOWN: GOTO RL. | KEY UP: GOTO XX. | t > 0.2s: STEP RIGHT. |
| RL | RIGHT KEY PRESSED BEFORE LEFT | KEY UP: JUMP RIGHT, GOTO RR. | KEY UP: GOTO XL. | t > 3.0s: ESCAPE, GOTO WB. |
| LR | LEFT KEY PRESSED BEFORE RIGHT | KEY UP: GOTO XR. | KEY UP: JUMP LEFT GOTO LL. | t > 3.0s: ESCAPE, GOTO WB. |
| XB | BOTH KEYS PRESSED AT ONCE | KEY UP: GOTO BR. | KEY UP: GOTO BL. | t > 3.0s: ESCAPE, GOTO WB. |
| BL | BOTH KEYS PRESSED, LEFT HELD | KEY UP: SELECT GOTO XX. | KEY DOWN: JUMP LEFT, GOTO LR. | t > 0.6s: JUMP LEFT, GOTO LL. |
| BR | BOTH KEYS PRESSED, RIGHT HELD | KEY DOWN: JUMP RIGHT, GOTO RL. | KEY UP: SELECT, GOTO XX. | t > 0.6s: JUMP RIGHT, GOTO RR. |
| WB | WAIT FOR BOTH KEYS TO BE RELEASED | KEY UP: GOTO WR. | KEY UP: GOTO XX. | NONE |
| WL | WAIT FOR LEFT KEY TO BE RELEASED | KEY UP: GOTO XX. | KEY DOWN: GOTO WL. | NONE |
| WR | WAIT FOR RIGHT KEY TO BE RELEASED | KEY DOWN: GOTO WB. | KEY UP: GOTO XX. | NONE |

GRAPHICAL USER INTERFACE FOR INPUTTING DATA

The present invention relates to user interfaces and in particular to graphical user interfaces (GUI's).

GUI's are now a common part of many items of electrical and electronic equipment and enable a user to interface with the equipment by entering data by pressing keys or buttons so as to select items of data to be entered from a displayed menu.

One simple example of an item which can frequently include a GUI is the digital watch. With the advent of extremely cheap and small microprocessors and memories it has become a frequent practice to provide digital watches with more and more functions. These can include giving alarms, storing telephone numbers and addresses and also carrying out quite sophisticated calculations. It will be appreciated that a wrist watch is relatively small so that any way in which data can be entered into the watch in a simple manner and with a very compact interface will be advantageous. It will also be appreciated that there are many other comparable situations where data has to be entered via a physical interface which is as small or as simple as possible.

One conventional approach for entering data is to use a two button GUI in association with a display screen. With such an arrangement it is common for one button to be used to scroll through a menu displayed on the display screen with the other button being used to select items from the menu.

However, this arrangement has problems. For example, if by pressing the first button too many times, the user misses the wanted item, then the user has to carry on through the menu in the hope that it will wrap around to reach the wanted item again. The known arrangement has further problems in that it lacks flexibility.

The present invention is concerned with providing a solution to this problem.

In accordance with the present invention there is provided an interface for inputting data comprising two manually operable direction buttons, and microprocessor means for outputting signals generating a visual display comprising a menu, the microprocessor means in response to operation of the buttons enabling a user to make selections from the menu and to cause relative movement between the menu and a cursor, and wherein the microprocessor responds to the intermittent pressure of a single button to step the cursor relative to the menu in a first direction or a second direction in dependence upon the button depressed.

In order that the present invention may be more readily understood an embodiment thereof will now be described by way of example and with reference to the accompanying drawings, in which:

FIG. 2 is a table illustrating the operation of the two button GUI of FIG. 1;

Figure 1:
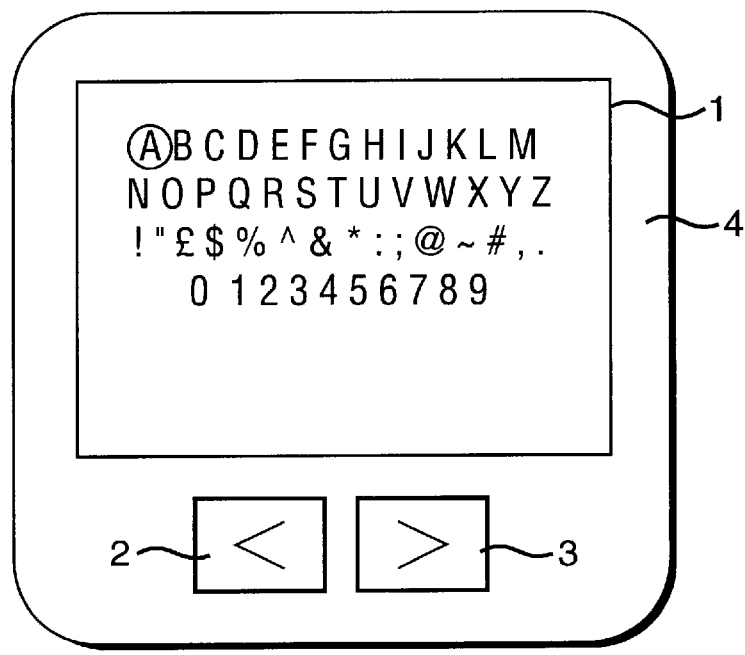
FIG. 1 is a plan view of a two button GUI.
Figure 6:
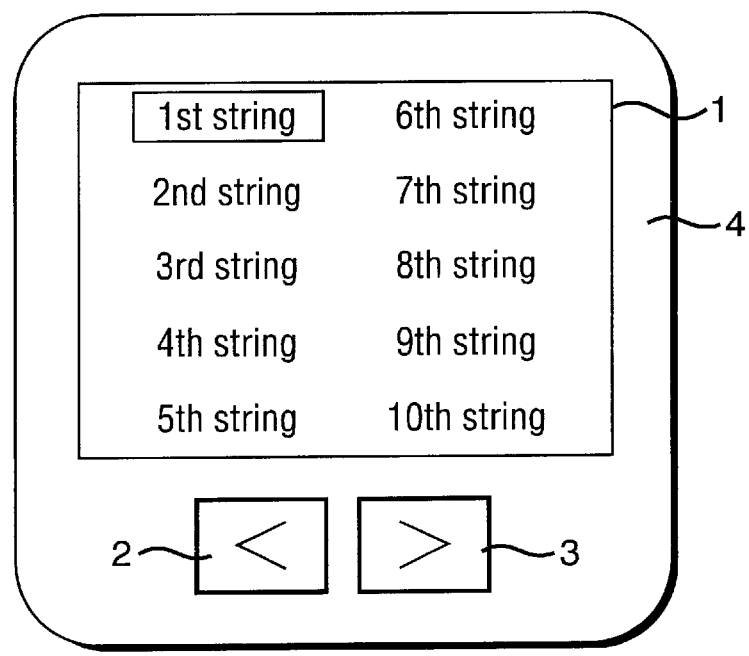
Figure 3:
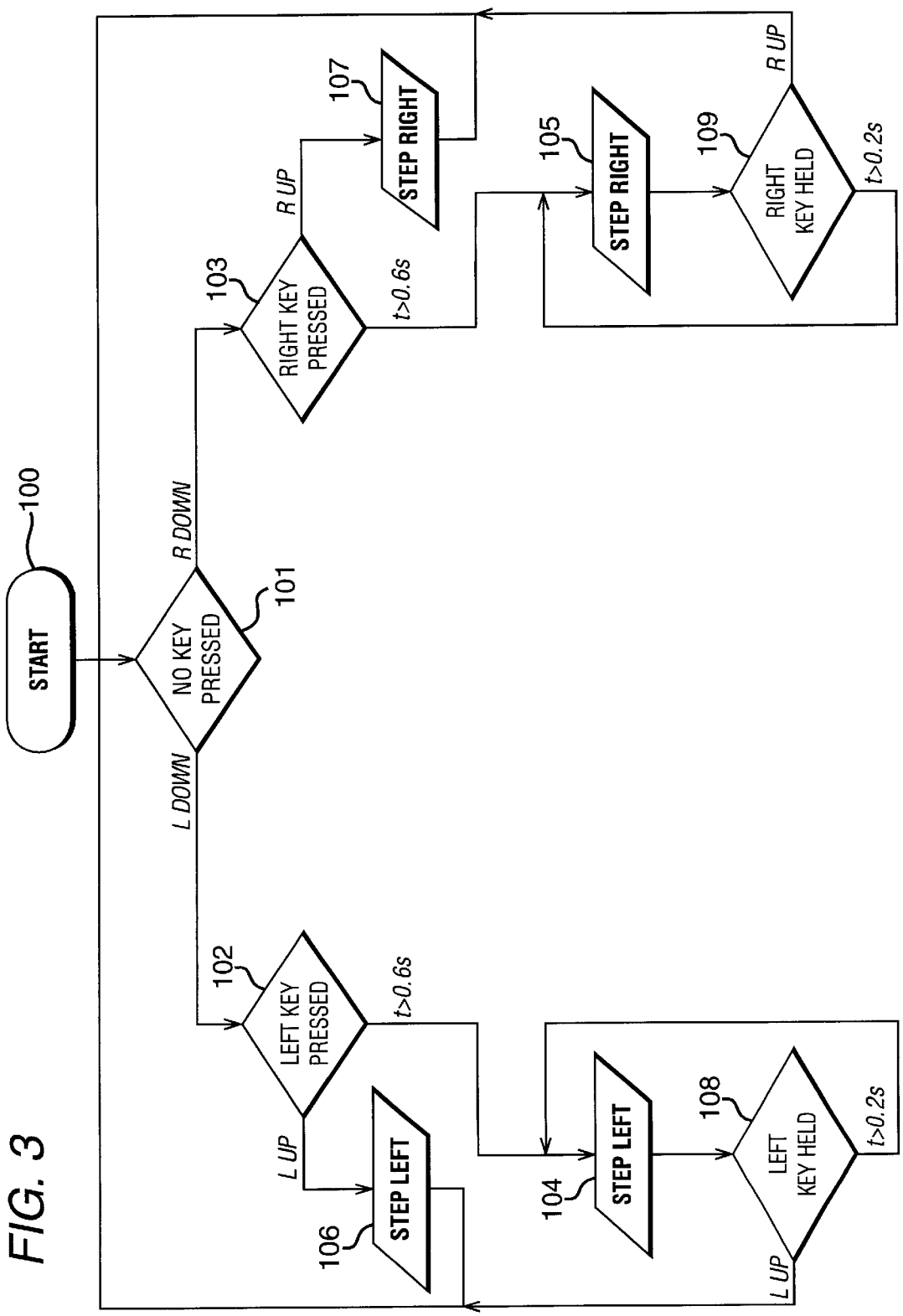
Figure 4A:
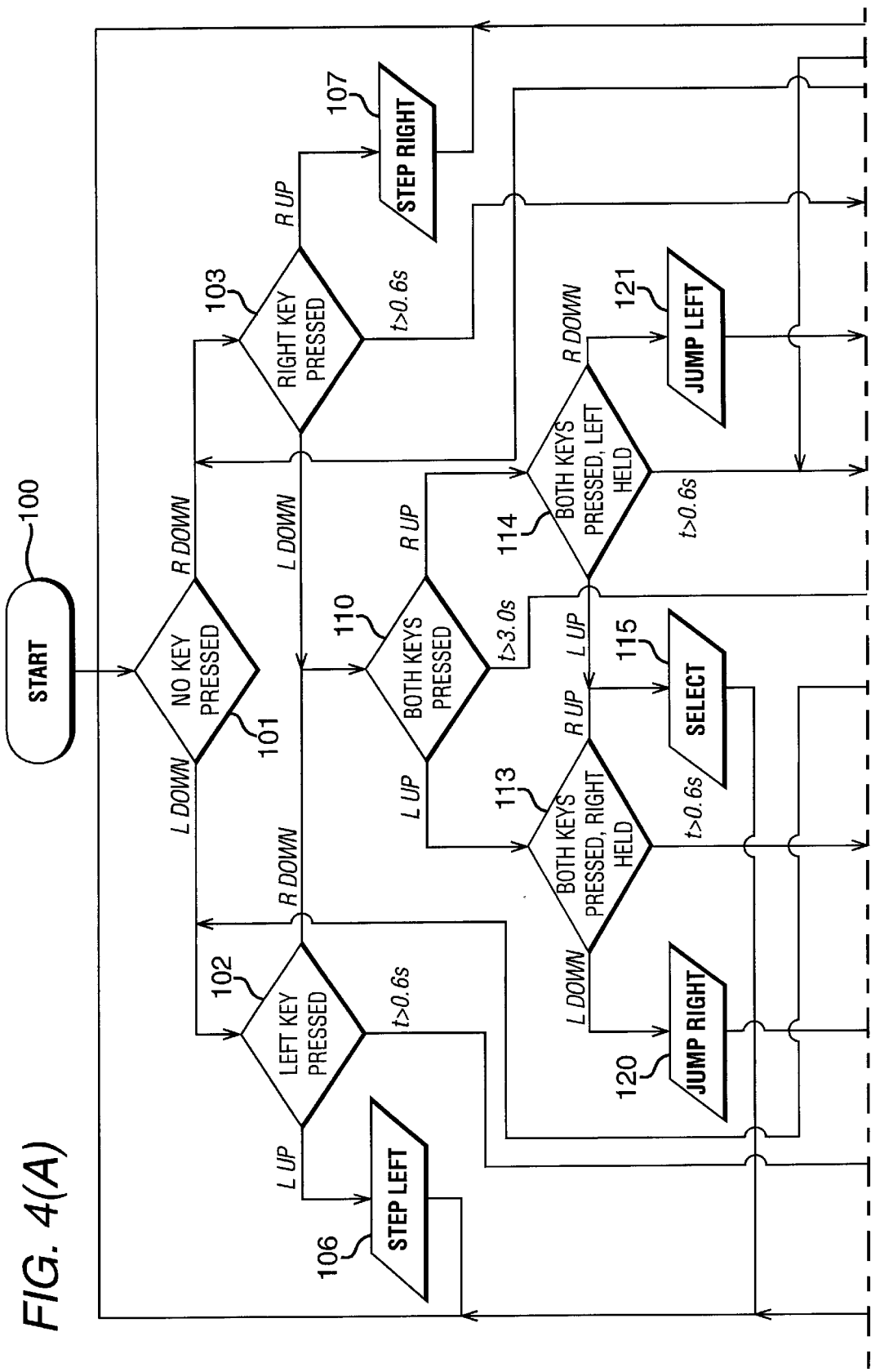
Figure 4B:
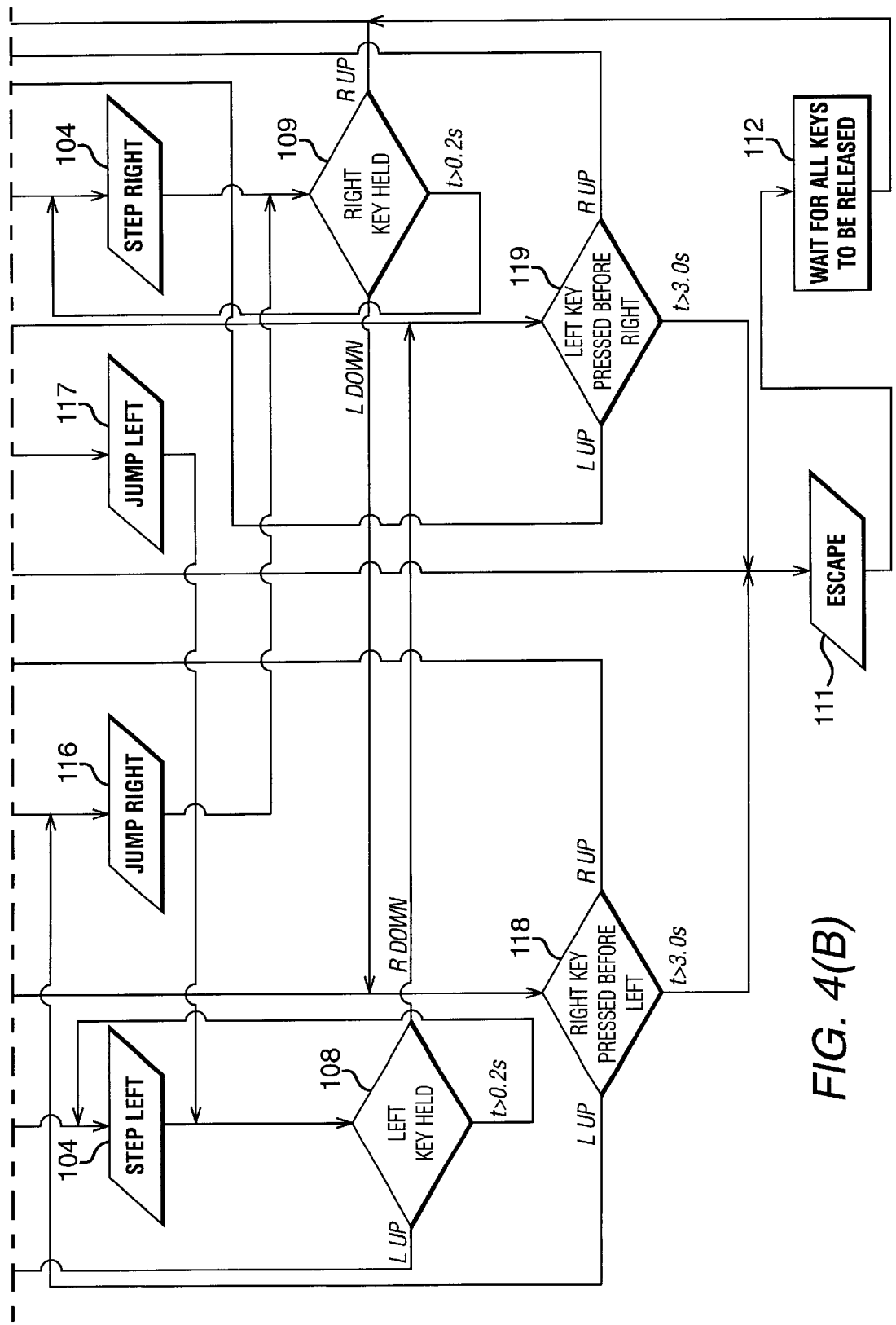
Figure 5:
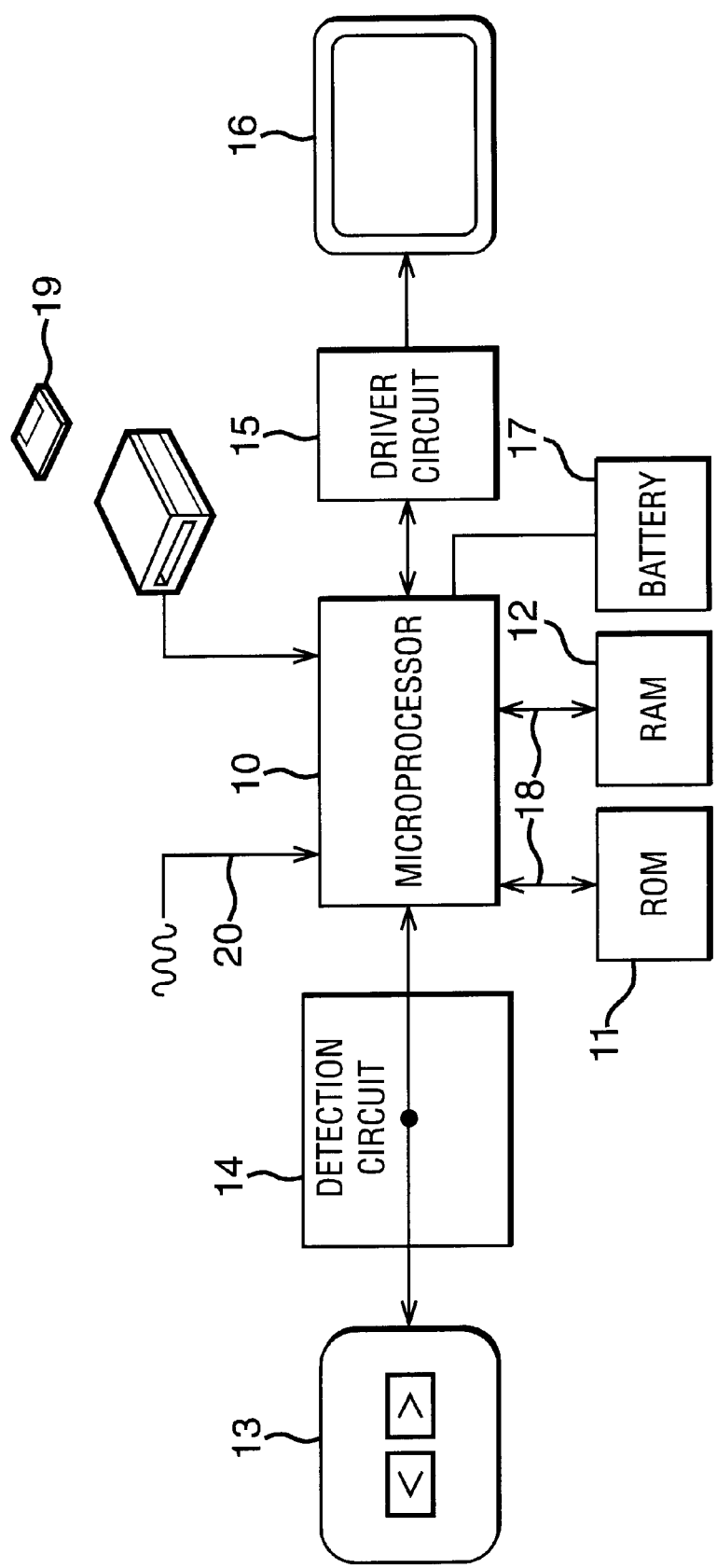

FIGS. 3, 4A, and 4B are flow diagrams also illustrating the operation of the two button GUl of FIG. 1; and FIG. 5 is a block diagram of the main circuit elements. of the two button GUI of FIG. 1; and FIG. 6 is a view similar to FIG. 1 showing another mode of operation.

Referring now to the drawings and in particular to FIG. 1, there is illustrated a two button GUI including a display 1 and two buttons 2 and 3 mounted in a casing 4.

It is to be appreciated that the display 1 could be part of another piece of equipment such as a watch, a control panel or any other apparatus or device in which data has to be entered.

The display shown on the display panel 1 is shown in simplified form and merely consists of the ten basic numerals and the letters of the alphabet together with an area 5 which is reserved to display data entered via the two buttons 2 and 3. It will be seen that buttons 2 and 3 are respectively marked with the signs <and >. These signs act both to differentiate between the buttons and the to give a partial indication of their functions as will be described hereinafter. Other symbols may be used. For example, if the list is arranged vertically on the screen, 'up' and 'down' arrows may be more useful.

It will be appreciated that the term "menu" as used in the present specification is intended to cover any list from which items can be selected. FIG. 6 shows another form of list or menu from which a selection can be made by operating the buttons 2 and 3. In FIG. 6 the various alpha-numeric characters and symbols have been replaced by character strings. Additionally, the displayed menu can be in the form of a software keyboard.

As can be seen in FIG. 1, the letter A has been encircled. This circle represents a cursor which on operation of the buttons can be stepped along the lines of characters and numerals to enable the user of the interface to make a selection. It is to be appreciated that this representation of the cursor is purely by way of example and any other suitable visible or audible format could be employed. For example, while the entire alphabet is displayed on display 1 along with all the ten numerals a directly equivalent effect could be achieved by having a single "window" displaying either a character or a numeral so that operation of a button caused the character or numeral display to be changed sequentially so as to scan through the full range of characters and numerals. This single-character menu display could be made easier to use by adding a bar or slider to give a graphical display of the progress through the menu. Thus, whenever the terms cursor and menu are used in this specification it is intended that these terms also encompass any situation described above.

Returning now to the signs on the buttons, the sign on button 2 indicates that pressing this button will cause the cursor to move to the left relative to the display while operation of the other button will cause relative movement in the opposite direction. Additionally, if key 2 is held down then the cursor will continue to step through the menu in the fashion of keyboard auto repeat. Key 3 operates in exactly the same manner but in the opposite direction.

In order to select an item when the cursor has stopped relative to the memory, a user depresses the two keys together then promptly releases them. Naturally, it is virtually impossible for a user to depress two keys absolutely simultaneously. Thus, in the present embodiment it is assumed that keys pressed within 0.6 seconds of one another were depressed together.

In order for a user to escape, either to another part of the menu display or to signal the end of data entry, the two keys are held depressed for a predetermined period substantially longer than 0.6 seconds. In the present embodiment this period is three seconds. However, the periods described herein can of course be varied.

In addition to the auto repeat function achieved by holding one of keys 2 and 3 depressed, it is possible to move even more quickly scroll through the menu by holding one key down and then "touching" the other key. In this way the cursor can be made to jump relative to the memory with the direction of the jump being controlled by the key which is held depressed. It will also be appreciated that a two dimensional menu might use these jumps to cause the cursor to move up and down columns rather than along rows.

The basic actions controlled by the buttons are as set out hereinafter in Table A.

TABLE A

| ACTION | RESULT |
| --- | --- |
| BOTH KEYS UP | NOTHING |
| LEFT KEY PRESSED AND RELEASED WITHIN 0.6 SECONDS | 1 STEP LEFT |
| LEFT KEY PRESSED AND HELD >0.6 SECONDS | SEVERAL STEPS LEFT |
| RIGHT KEY DEPRESSED AND RELEASED WITHIN 0.6 SECONDS | 1 STEP RIGHT |
| RIGHT KEY DEPRESSED AND HELD >0.6 SECONDS | SEVERAL STEPS RIGHT |
| BOTH KEYS PRESSED TOGETHER (WITHIN 0.6 SECONDS OF EACH OTHER) AND RELEASED TOGETHER | SELECT |
| BOTH KEYS PRESSED TOGETHER AND HELD >0.6 SECONDS | ESCAPE |
| LEFT KEY DEPRESSED >0.6 SECONDS AND RIGHT KEY DEPRESSED AND RELEASED | JUMP LEFT |
| RIGHT KEY DEPRESSED >0.6 SECONDS AND LEFT KEY DEPRESSED AND RELEASED | JUMP RIGHT |

Referring now to FIG. 2 of the drawings, there is shown a more comprehensive table of the operations which can be carried out using the buttons 2 and 3.

The table in FIG. 2 is organized into five columns. The first column, headed "INTERNAL STATE," merely lists two letter names given to each state which can occur during operation of the two keys. The second column, headed "STATE," is a brief description of the actual state. Thus "XX" is the name of the state where no key has been depressed, XL the name of the state where the key 2 (<) has been depressed, and LL is the state where they key 2 has been depressed and held down and so on.

The next column "LEFT KEY ACTION" represents the sequence of events which will follow if an action changes the state of the key 2. For each state there is only one possible action. If key 2 is pressed, then the action is to release it. If the key 2 is not pressed, then the action is to press it. As can be seen from the table, most actions change the internal state.

The fourth column entitled "RIGHT KEY ACTION" is similar to the third column but represents the consequences of actions using the right hand key 3 (>).

The final column entitled "TIME OUT ACTION" represents the consequences of holding the current state until some time limit expires. Some of the states do not have a time limit.

An example of how the table shown in FIG. 2 operates is as follows.

The state XX, as indicated in the internal state column, is the rest state with neither key depressed. If the first action available in the table is taken, namely KEY DOWN: go to XL, it will be seen that XL is the state where the left key 2 has been depressed. It will also be seen from the extreme right hand column (TIE OUT ACTION) that there is no time limit that would trigger an action if we had remained in state XX.

Once the XL state has been reached there are two possible actions that do not involve the right key 3. If the key 2 is quickly released, the left key action column shows the cursor steps 1 to the left and the internal state returns to XX. If the key 2 is held down the TIME OUT ACTION column shows that after 0.6 seconds after the key 2 was depressed the internal state changes to LL.

However, a further key action is available as indicated in the RIGHT KEY ACTION column. If the right key is depressed before the left key is released, and before the time limit for state XL is reached, then the internal state changes to XB. State XB is the state reached when the user depresses both keys together.

Thus, by following the action columns of the table and the resulting internal states in the internal state column an accurate representation of the operation of the two button action interface can be obtained.

It is thus possible to give a some simple exemplary sequences in which data is input for storage using the arrangement shown in FIG. 1. It will be assumed that the data to be entered is a person's name and an associated telephone number, and that on activation of the interface the cursor's start position is the letter A in the alphabetic display. A user can then point to any letter using the keys 2 and 3 by moving the cursor to the desired letter. This can be done step-by-step, by pressing the keys, continuously by holding the keys, in jumps, or by any combination of any of these actions. Once the letter has been pointed to, both keys are depressed simultaneously to select the letter for entry into the first available space. Once this has been done the next letter is pointed to and so on.

Once the alphabetical part of the data to be stored has been input the user can step into the number display and select numbers in the same manner.

The data input process can be ended by holding down both keys for 3 seconds.

It will be appreciated that it is not necessary to display either the whole alphabet or all the numbers on the menu. A single digit display would suffice and instead of a moving cursor the display could step sequentially through the characters and the digits. Whenever mention is made in this specification of a cursor and a menu which moves relative to the cursor it will be appreciated that the configuration just described above is intended to be included within this definition. Whichever type of menu is utilized, the last menu item can be a choice as to whether or not the data entered is to be saved, with one key equalling the YES and the other key equalling NO.

It is possible to extend the table in FIG. 2 to recognize other key actions. An example of such a key action is the "roll right", which consists of pressing and holding the left key, pressing and holding the right key, releasing the left key, and finally releasing the right key.

It is appreciated that the entire range of possible events is difficult to follow from Table A. It is also difficult to represent the possible actions which can be achieved using the two button GUI in a flow diagram as of course there is not necessarily a logical progression from beginning to end and from one action to another as Nevertheless, FIG. 3 is a flow chart which illustrates the basic stepping property of the two button GUI of FIG. 1. Reference numeral 100 represents the start of a sequence and 101 indicates the state of the GUI in which neither key has been pressed. At each "lozenge" the user has three options. These are: (1) to change the state of the key, (2) to change the state of the right key or (3) to wait without changing the state of either key.

In conventional flow diagrams, the decision facing the user is written in the "lozenge" boxes. In FIGS. 3 and 4 "lozenge" boxes contain a brief description of the current state of the buttons. This was done to save space and because the three options available are always the same.

The paths from the lozenges are labelled with the user's action. For clarity throughout there has been used the left-hand path for actions involving the left-hand button, the right-hand path for actions involving the right-hand button, and the lower path for actions where the present state is held.

For example, consider lozenge-shaped box 102. The left button has been pressed, but the right one has not. The left-hand path labelled "L up" is taken if the left button is released. The right-hand path labelled "R down" is taken if the right button is pressed. The lower path labelled "t>0.6 seconds" is taken if the user does not take either the left-hand path or the right-hand path within 0.6 seconds.

The lozenges at 102 and 103 represent states similar to the state column of Table 1 of FIG. 2. The outputs of the lozenges represent particular conditions of the state represented by the lozenge. Thus, the bottom outputs of 102 and 103 show the paths followed if the respective button is held down for more than 0.6 seconds or released before the expiry of 0.6 seconds. In each case the respective subsequent boxes 104, 105, 106, 107 indicate the actions which ensue.

If a key, left or right, is held down for more than 0.6 seconds the sequence enters a loop shown for the left key at 104 and 108 and for the right key at 105 and 109. In each case there is a step in the direction specified by the key which is repeated at 0.2 second intervals if the key is held down. Once a key is released the loop returns to 101.

Having explained the basic principles of the flow chart of FIG. 3 for a simple action it can be seen that the flow chart of FIG. 4 uses the same principles but includes the much more complex states where both keys are pressed together and where one key is released at a different time from the other key.

Similar states and actions in FIG. 4 have been given the same reference numerals and will not be described again.

Thus 110 represents the state where both keys have been pressed within 0.6 seconds. It is assumed that the user cannot press both keys at exactly the same time, so the path can go from 101 to 110 via 102 or 103.

If both keys are held for 3 seconds, the ESCAPE action represented by the box 111 is invoked wait for all keys to be released, then return to 101.

If both keys are pressed and then released then the SELECT action represented by box 115 is invoked. It is assumed that the user cannot release both keys at exactly the same time, so the path can go from 111 to 115 via 113 or 114, and then returns to 101.

If the left key 108 is held and the right key is pressed the state depicted at 119 is invoked. The JUMP LEFT action represented by box 117 is invoked when the right key is released.

If the left key is held for less than 0.6 seconds before the right key was pressed then the flow would start from 102, go to 110 when the right key is pressed and go to 114 when the right key is released. Releasing the left key quickly would then invoke the SELECT action 115, but holding the left key 117 or pressing the right key again 121 invoke the JUMP LEFT action.

The process to invoke the JUMP RIGHT action is the mirror image of the process to invoke'the JUMP LEFT action which has just been described.

The remaining lines in the flow diagram ensure that any user action should give a sensible result. For example ESCAPE 111 can be reached from any state by pressing all the keys down 110, 118 or 119 and holding them for 3 seconds.

The states WB, WL and WR of FIG. 2 are not shown as separate states in FIG. 4. For simplicity these have been combined into a single process 112.

There are some potentially useful variations not covered by FIG. 4. The ROLL RIGHT and ROLL LEFT actions mentioned earlier do not appear. There may be extra states which may be better resolved between pressing two buttons at once and pressing one after the other; both of which are currently represented by box 110.

It will be appreciated that the timings given can be varied.

This two key interface can be extended by the addition of other keys while still incorporating the basic feature of using combinations of keys to carry out specific functions. Thus, a third key could be added which has the same effect'as pressing the two keys simultaneously. Additionally, if there is a relatively complex menu in tabular form up and down keys (^ and V) could be added so that a user can jump between rows. In the same manner as the left and right keys, continuous pressure on one key alone could provide a scrolling action, and holding one key down while tapping the other key could provide rapid jumps over a number of rows.

It is also possible to extend the two button interface by adding other extra buttons. This extended interface could behave more like a conventional set of cursor keys, but would still have the option to be used as a two button GUI.

It is also possible to implement the two button interface using a joystick, a joystick key which locks about a pivot, or some other such device. Holding a joystick key to the left or right would correspond to pressing a single key, while pressing a joystick key down would correspond on a two button GUI to pressing both keys.

Referring now to FIG. 5 of the accompanying drawings, there is illustrated the basic elements required for the operation of the two button GUI which has just been described.

FIG. 5 shows a microprocessor 10, a ROM 11 storing operational parameters for the microprocessor 10 and a RAM 12 both for storing data and acting as a temporary store during calculations carried out by the microprocessor. A two button interface is shown at 13 and a detection circuit 14 detects the pressing and releasing of the buttons of the interface 13. Actual timing is carried out by the internal clock of the microprocessor 10. The microprocessor 10 also controls a driver circuit 15 for a liquid crystal display 16 and power is supplied by a battery 17. The microprocessor is connected to the various circuits which it controls or from which it receives information by suitable buses indicated by 18. It is possible for the display to be any other kind of suitable microprocessor driven display. The control program under which microprocessor 10 operates to respond appropriately to the two button interface can be stored on any processor-readable medium such as a floppy disk indicated at 19 or a memory chip (not shown). Alternatively, the program can be transferred to the microprocessor via a signal line shown at 20 which may be a local or long distance data transfer line, a radio transmission or a signal derived from the internet so that the program is carried by a signal implementable by the microprocessor.

It is anticipated that the buttons of the interface will be depressed by a user's fingers but it is of course possible for them to be so small that satisfactory depression and release can only be achieved by using a stylus.

What is claimed is:

1. An interface for inputting data comprising two manually operable direction buttons, and a microprocessor for outputting signals generating a visual display comprising a menu, and in response to operation of the buttons enabling a user to make selections from the menu and to cause relative movement between the menu and a cursor, wherein the microprocessor is adapted to respond to intermittent pressure of a single button to step the cursor relative to the menu in either a first or a second direction in dependence upon the button depressed and is further adapted to scroll a cursor relative to the menu in one or the other of said directions when the button associated with that direction is held down for a period of time greater than a preset period, and wherein when one button is held down for a period greater than said preset period and the other button is intermittently pressed the microprocessor causes the cursor to jump relative to the menu.

2. An interface according to claim 1, further comprising a third key, wherein the microprocessor responds to operation of the third key to select the menu items indicated by the cursor.

3. An interface according to claim 1, further comprising two further direction buttons operative to generate via the microprocessor cursor movement relative to menu in direction transverse to said first and second directions.

4. An interface according to claim 1, further comprising display means for generating a display in response to the signals output by the microprocessor.

5. An interface according to claim 1, further comprising a memory for storing data input via said buttons.

6. An interface according to claim 1, wherein the menu comprises a list composed of character strings.

7. An interface according to claim 1, wherein the menu comprises the display of a software keyboard.

8. An interface for inputting data comprising two manually operable direction buttons, and a microprocessor for outputting signals generating a visual display comprising a menu, and in response to operation of the buttons enabling a user to make selections from the menu and to cause relative movement between the menu and a cursor, wherein the microprocessor is adapted to respond to intermittent pressure of a single button to step the cursor relative to the menu in either a first or a second direction in dependence upon the button depressed and is further adapted to scroll a cursor relative to the menu in one or the other of said directions when the button associated with that direction is held down for a period of time greater than a preset period, and wherein simultaneous operation of both buttons enables selection of a menu item.

9. An interface according to claim 8, wherein the two keys are replaced by a joystick or by a single key lockable about a pivot point, downward pressure on either the joystick or the single key corresponding to simultaneous pressure on two keys.

10. An interface for inputting data comprising two manually operable direction buttons, and a microprocessor for outputting signals generating a visual display comprising a menu, and in response to operation of the buttons enabling a user to make selections from the menu and to cause relative movement between the menu and a cursor, wherein the microprocessor is adapted to respond to intermittent pressure of a single button to step the cursor relative to the menu in either a first or a second direction in dependence upon the button depressed and is further adapted to scroll a cursor relative to the menu in one or the other of said directions when the button associated with that direction is held down for a period of time greater than a preset period, and wherein depressing both buttons for more than a predetermined period of time acts as an escape signal to said microprocessor.

11. A method of operating an interface for inputting data comprising two manually operable direction buttons, and a microprocessor for outputting signals generating a visual display comprising a menu, and in response to operation of the buttons enabling a user to make selections from the menu and to cause relative movement between the menu and a cursor, the method comprising causing intermittent pressure of a single button to cause the microprocessor to step the cursor relative to the menu in either a first or a second direction in dependence upon the button depressed and further scrolling a cursor relative to the menu in one or the other of said directions by holding down the button associated with that direction for a period of time greater than a preset period, wherein when one button is held down for a period greater than said preset period and the other button is intermittently pressed the microprocessor causes the cursor to jump relative to the menu.

12. A method according to claim 11, wherein the microprocessor responds to operation of a third key to select a menu item indicated by the cursor.

13. A method according to claim 11, said interface further comprising two further direction buttons operative to generative via the microprocessor cursor movement relative to the menu in direction transverse to said first and second directions.

14. A method according to claim 11, further comprising generating a display in response to the signals output by the microprocessor.

15. A method according to claim 11, further comprising storing data input via said buttons in a memory.

16. A method according to claim 11, wherein the menu comprises a list composed of character strings.

17. A method according to claim 11, wherein the menu comprises a software keyboard.

18. A method of operating an interface for inputting data comprising two manually operable direction buttons, and a microprocessor for outputting signals generating a visual display comprising a menu, and in response to operation of the buttons enabling a user to make selections from the menu and to cause relative movement between the menu and a cursor, the method comprising causing intermittent pressure of a single button to cause the microprocessor to step the cursor relative to the menu in either a first or a second direction in dependence upon the button depressed and further scrolling a cursor relative to the menu in one or the other of said directions by holding down the button associated with that direction for a period of time greater than a preset period, wherein simultaneous operation of both buttons enables selection of a menu item.

19. A method according to claim 18, wherein the two keys are replaced by a joystick or by a single key lockable about a pivot point, downward pressure on either the joystick or the single key corresponding to simultaneous pressure on two keys.

20. A method of operating an interface for inputting data comprising two manually operable direction buttons, and a microprocessor for outputting signals generating a visual display comprising a menu, and in response to operation of the buttons enabling a user to make selections from the menu and to cause relative movement between the menu and a cursor, the method comprising causing intermittent pressure of a single button to cause the microprocessor to step the cursor relative to the menu in either a first or a second direction in dependence upon the button depressed and further scrolling a cursor relative to the menu in one or the other of said directions by holding down the button associated with that direction for a period of time greater than a preset period, wherein depressing both buttons for more than a predetermined period of time acts as an escape signal to said microprocessor.

21. A storage medium storing processor implementable instructions for controlling a processor to carry out the method of operating an interface for inputting data comprising two manually operable direction buttons, and a microprocessor for outputting signals generating a visual display comprising a menu, and in response to operation of the buttons enabling a user to make selections from the menu and to cause relative movement between the menu and a cursor, the method comprising causing intermittent pressure of a single button to cause the microprocessor to step the cursor relative to the menu in either a first or a second direction in dependence upon the button depressed and further scrolling a cursor relative to the menu in one or the other of said directions by holding down the button associated with that direction for a period of time greater than a preset period, wherein when one button is held down for a period greater than said preset period and the other button is intermittently pressed the microprocessor causes the cursor to jump relative to the menu.

22. A computer program comprising processor implementable instructions for controlling a processor to carry out the method of operating an interface for inputting data comprising two manually operable direction buttons, and a microprocessor for outputting signals generating a visual display comprising a menu, and in response to operation of the buttons enabling a user to make selections from the menu and to cause relative movement between the menu and a cursor, the method comprising causing intermittent pressure of a single button to cause the microprocessor to step the cursor relative to the menu in either a first or a second direction in dependence upon the button depressed and further scrolling a cursor relative to the menu in one or the other of said directions by holding down the button associated with that direction for a period of time greater than a preset period, wherein when one button is held down for a period greater than said preset period and the other button is intermittently pressed the microprocessor causes the cursor to jump relative to the menu.

23. A storage medium storing processor implementable instructions for controlling a processor to carry out the method of operating an interface for inputting data comprising two manually operable direction buttons, and a microprocessor for outputting signals generating a visual display comprising a menu, and in response to operation of the buttons enabling a user to make selections from the menu and to cause relative movement between the menu and a cursor, the method comprising causing intermittent pressure of a single button to cause the microprocessor to step the cursor relative to the menu in either a first or a second direction in dependence upon the button depressed and further scrolling a cursor relative to the menu in one or the other of said directions by holding down the button associated with that direction for a period of time greater than a preset period, wherein simultaneous operation of both buttons enables selection of a menu item.

24. A storage medium storing processor implementable instructions for controlling a processor to carry out the method of operating an interface for inputting data comprising two manually operable direction buttons, and a microprocessor for outputting signals generating a visual display comprising a menu, and in response to operation of the buttons enabling a user to make selections from the menu and to cause relative movement between the menu and a cursor, the method comprising causing intermittent pressure of a single button to cause the microprocessor to step the cursor relative to the menu in either a first or a second direction in dependence upon the button depressed and further scrolling a cursor relative to the menu in one or the other of said directions by holding down the button associated with that direction for a period of time greater than a preset period, wherein depressing both buttons for more than a predetermined period of time acts as an escape signal to said microprocessor.

25. A computer program comprising implementable instructions for controlling a processor to carry out the method of operating an interface for inputting data comprising two manually operable direction buttons, and a microprocessor for outputting signals generating a visual display comprising a menu, and in response to operation of the buttons enabling a user to make selections from the menu and to cause relative movement between the menu and a cursor, the method comprising causing intermittent pressure of a single button to cause the microprocessor to step the cursor relative to the menu in either a first or a second direction in dependence upon the button depressed and further scrolling a cursor relative to the menu in one or the other of said directions by holding down the button associated with that direction for a period of time greater than a preset period, wherein simultaneous operation of both buttons enables selection of a menu item.

26. A computer program comprising implementable instructions for controlling a processor to carry out the method of operating an interface for inputting data comprising two manually operable direction buttons, and a microprocessor for outputting signals generating a visual display comprising a menu, and in response to operation of the buttons enabling a user to make selections from the menu and to cause relative movement between the menu and a cursor, the method comprising causing intermittent pressure of a single button to cause the microprocessor to step the cursor relative to the menu in either a first or a second direction in dependence upon the button depressed and further scrolling a cursor relative to the menu in one or the other of said directions by holding down the button associated with that direction for a period of time greater than a preset period, wherein depressing both buttons for more than a predetermined period of time acts as an escape signal to said microprocessor.

\* \* \* \* \*

UNITED STATES PATENT AND TRADEMARK OFFICE
CERTIFICATE OF CORRECTION

PATENT NO. : 6,459,422 B1
DATED : October 1, 2002
INVENTOR(S) : Richard Kirk

It is certified that error appears in the above-identified patent and that said Letters Patent is hereby corrected as shown below:

Column 1,
Line 53, "and" should be deleted.

Column 2,
Line 3, "<and >" should read -- < and > --.
Line 4, "the" (second occurrence) should be deleted.
Line 59, "scroll" should read -- so as to scroll --.
Line 63, "two" should read -- two- --.

Column 3,
Line 29, "they" should read -- the --.
Line 50, "TIE" should read -- TIME --.

Column 4,
Line 21, "a" should be deleted.
Line 59, "as" should read -- as in a normal computer flow chart. --
Line 65, "key" should read -- left key --.

Column 5,
Line 40, "invoked" should read -- invoked, followed by 112 --.

Column 6,
Line 11, "effect' as" should read -- effect as --.
Line 14, "^" should read -- ∧ --.

Column 7,
Line 13, "menu" should read -- the menu --.

UNITED STATES PATENT AND TRADEMARK OFFICE
CERTIFICATE OF CORRECTION

PATENT NO. : 6,459,422 B1
DATED : October 1, 2002
INVENTOR(S) : Richard Kirk

It is certified that error appears in the above-identified patent and that said Letters Patent is hereby corrected as shown below:

<u>Column 8,</u>
Line 12, "erative" should read -- erate --.

Signed and Sealed this

Eleventh Day of November, 2003

JAMES E. ROGAN
*Director of the United States Patent and Trademark Office*